US006740264B1

(12) United States Patent
Reifel

(10) Patent No.: US 6,740,264 B1
(45) Date of Patent: May 25, 2004

(54) METHOD FOR MAKING AN OPTICAL COMPONENT

(75) Inventor: Dirk Reifel, Eragny sur Oise (FR)

(73) Assignee: Tyco Electronics Logistics AG, Steinach (CH)

(*) Notice: Subject to any disclaimer, the term of this patent is extended or adjusted under 35 U.S.C. 154(b) by 406 days.

(21) Appl. No.: 09/641,088

(22) Filed: Aug. 17, 2000

(30) Foreign Application Priority Data

Aug. 19, 1999 (DE) ........................................ 199 39 364

(51) Int. Cl.[7] ................................................ B29D 11/00

(52) U.S. Cl. ................ 264/1.24; 264/1.25; 264/272.15; 264/275

(58) Field of Search ............................... 264/1.24, 1.25, 264/271.1, 272.11, 272.15, 275; 383/92, 93

(56) References Cited

U.S. PATENT DOCUMENTS

| | | | | | |
|---|---|---|---|---|---|
| 4,152,624 A | | 5/1979 | Knaebel | |
| 5,094,518 A | * | 3/1992 | Musk | 385/35 |
| 5,690,141 A | | 11/1997 | Creaghe | 137/382 |
| 6,170,996 B1 | | 1/2001 | Miura et al. | 385/94 |
| 6,309,566 B1 | * | 10/2001 | Müller et al. | 264/1.25 |
| 6,312,624 B1 | * | 11/2001 | Kropp | 264/1.25 |

FOREIGN PATENT DOCUMENTS

| | | | |
|---|---|---|---|
| DE | 197 11 138 A1 | 9/1998 | H01L/21/68 |
| EP | 0592746 A1 | 10/1992 | H01S/510/22 |
| WO | WO 00/65394 | 11/2000 | G02B/6/42 |

OTHER PUBLICATIONS

Examination Report from German Patent Office dated Sep. 3, 1999.

* cited by examiner

*Primary Examiner*—Robert Davis
*Assistant Examiner*—Donald Heckenberg
(74) *Attorney, Agent, or Firm*—Barley Snyder

(57) ABSTRACT

A method of making an optical component wherein an optical component carrier is introduced through an opening (2) into a mold (1). The carrier is aligned relative to the mold (1) by means of at least one positioning means. A removable closure member (4) is introduced into a coupling portion of the mold to form an optical window surface (3). A light transmissive moldable material is filled into the mold (1) and cured. The closure member (4) is then removed to complete the optical component.

9 Claims, 7 Drawing Sheets

METHOD FOR MAKING AN OPTICAL COMPONENT

FIELD OF THE INVENTION

The present invention relates to an optical component and a method for making the same.

BACKGROUND OF THE INVENTION

Known methods for making an optical component, and in particular a light emitting diode (LED) for use with an optical connector, typically comprise the steps of overmolding the LED in a multipart mold, with the mold forming the component housing. The housing includes a coupling portion for connecting an optical waveguide. A transparent resin is preferably used to overmold the component. Prior to the overmolding operation, an opening, or so-called optical window, must be closed in the mold. In the known molds, the closing is accomplished by an integrally molded closure plug that is broken off at a predetermined breaking edge after the molding operation.

In the region of the optical window, it is necessary to have a highly accurate resin surface since light emitted by the LED or optical component during subsequent operation is coupled to the optical waveguide through the optical window. It is desirable to minimize losses through the optical window and therefore it is necessary to have a defect free surface on the optical window.

In case of the known, integrally molded closure plug, the surface forming this optical window is located inside the mold and thus is quite difficult to manufacture and control. This results in inevitable irregularities on this surface and an imperfect optical window surface, which greatly reduce device yield in such a process.

SUMMARY

Accordingly, it is an object of the present invention to provide a method and device for making optical components, without rejects, wherein the surface of an optical window at the optical component is formed as exact and defect free as possible.

Accordingly, the method of making an optical component having a molded body of a transparent moldable material, with the molded body being formed in a mold having an opening for introducing a carrier of an optical transducer, and the mold having a coupling portion for a mating assembly comprises the steps of introducing a closure member into the coupling portion; filling the moldable material into the mold; introducing the carrier through the opening into the mold and aligning the carrier in relation to the mold by means of at least one positioning means; curing the moldable material; and removing the closure member.

A device according to the invention is a mold for making an optical component comprising a molded body of a transparent moldable material, the molded body being molded in the mold having an opening for introducing a carrier of an optical transducer, the mold also having a coupling portion for a mating assembly, and a closure member for closing an opening in the coupling portion of the mold.

BRIEF DESCRIPTION OF THE DRAWINGS

The invention will now be described by way of example with reference to the accompanying drawings of which.

DETAILED DESCRIPTION OF THE PREFERRED EMBODIMENTS

Figure 1:
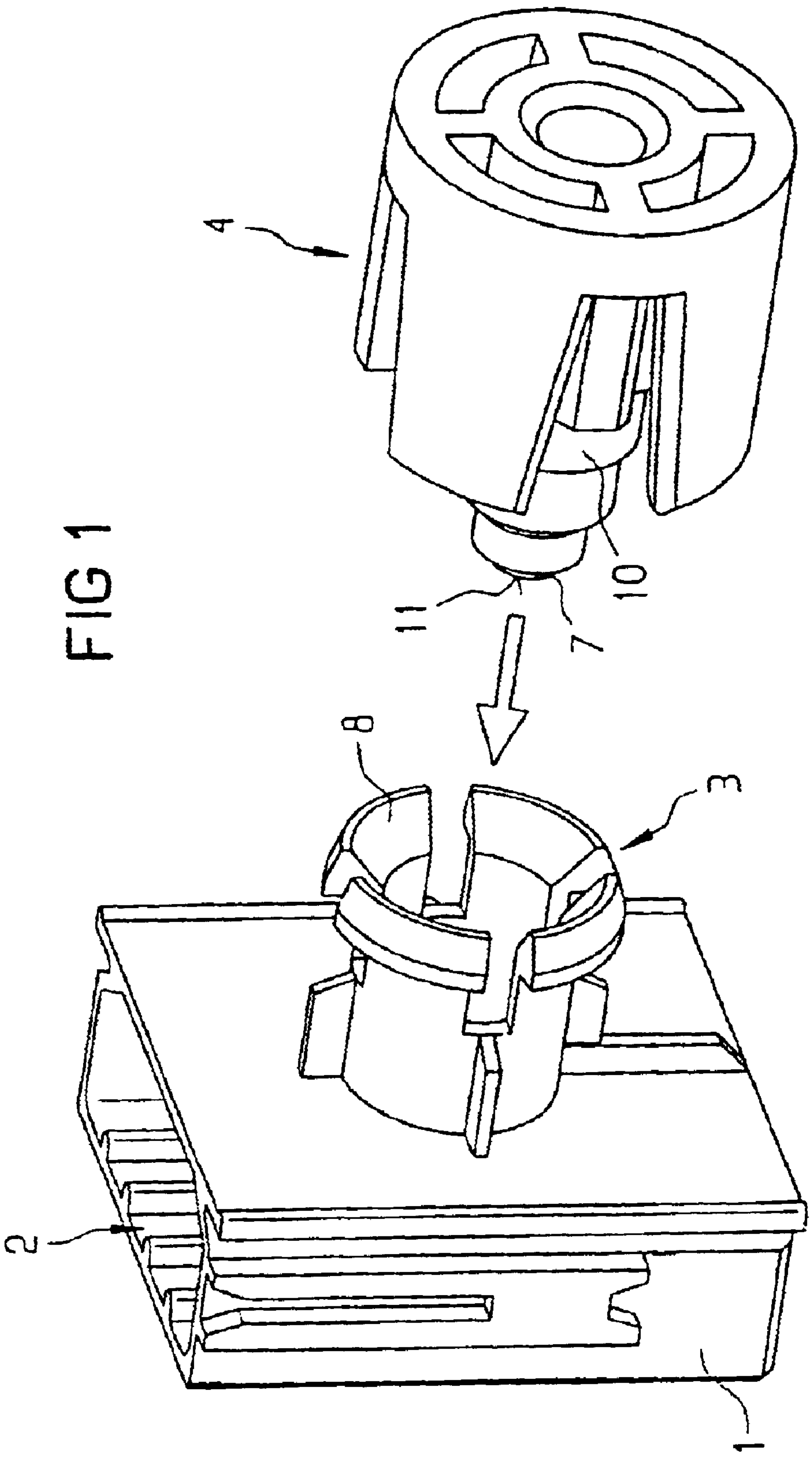
FIG. 1 shows a perspective view of a device according to the invention.

FIG. 1 depicts a mold 1 according to a first embodiment of the invention, having substantially the shape of a right parallelepiped and being provided with an opening 2 at the top side and with a coupling portion 3 along a side thereof.

Figure 3:
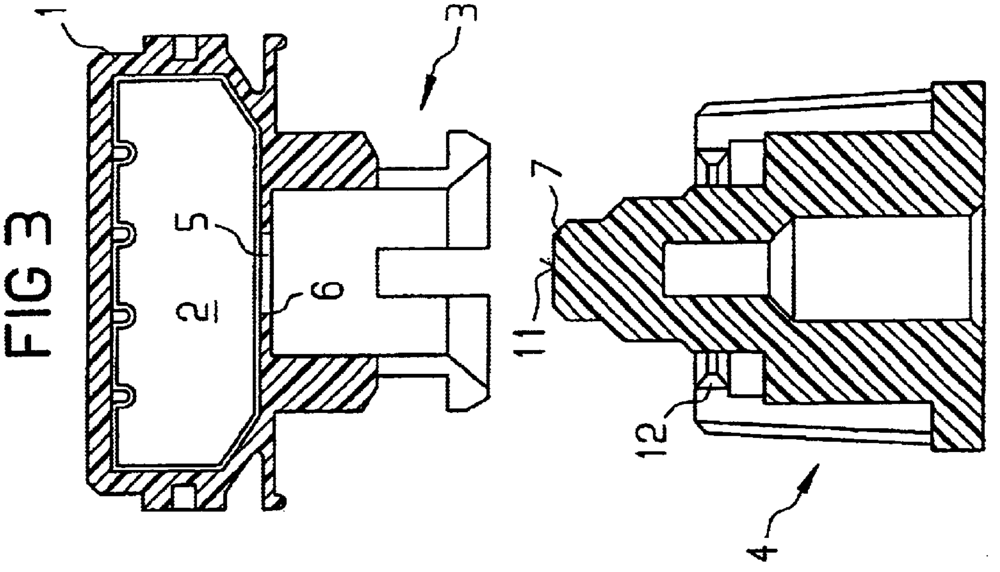
FIG. 3 shows a cross-sectional view of the device taken along the line 3—3 of FIG. 2.
Figure 2:
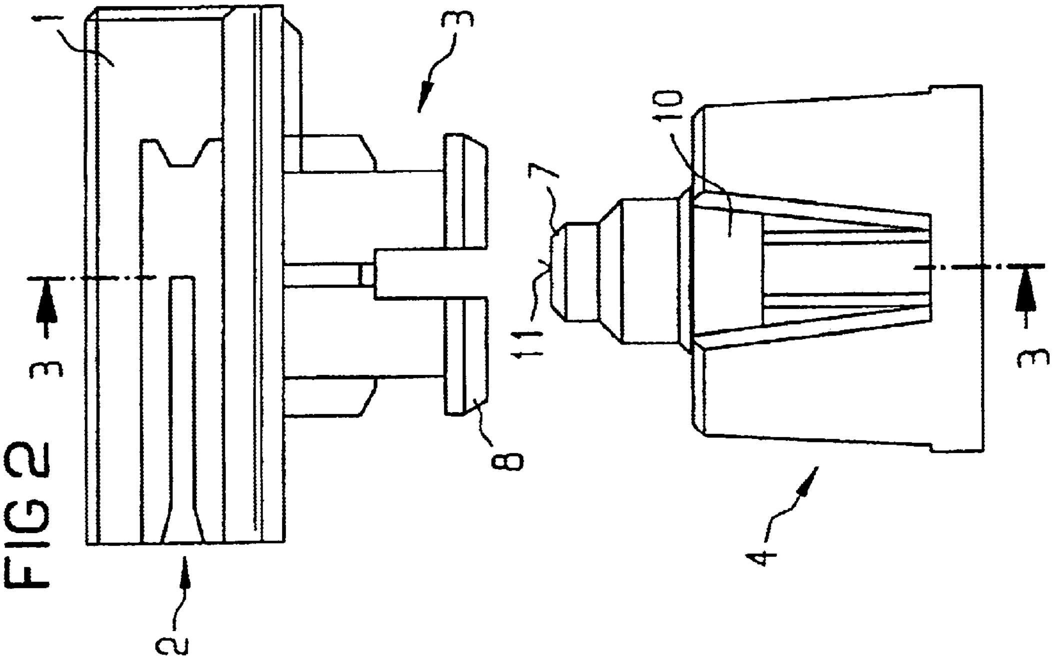
FIG. 2 shows a side view of the device of FIG. 1.
Figure 5:
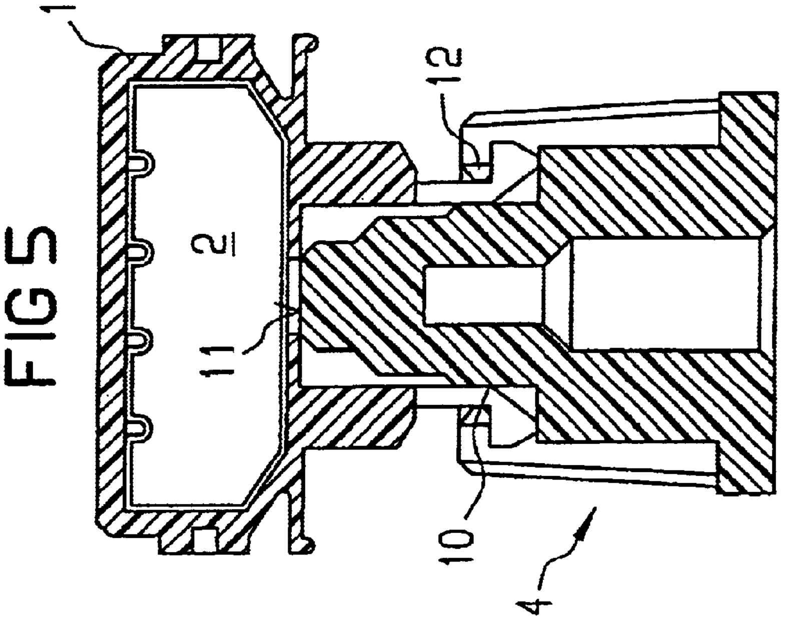
FIG. 5 shows a cross-sectional view of the device taken along the line 5—5 of FIG. 4.
Figure 4:
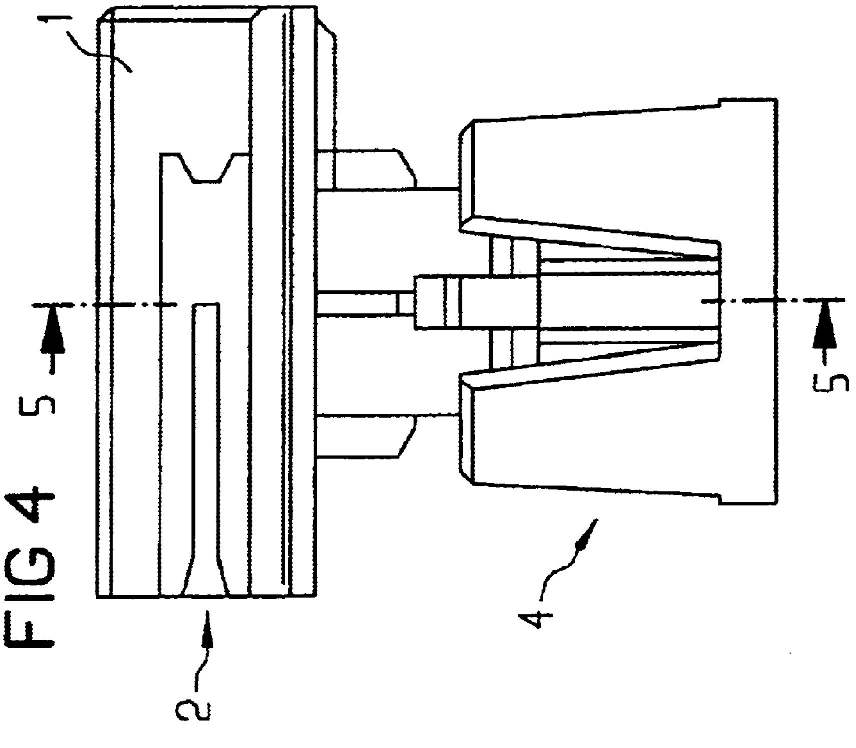
FIG. 4 shows a side view of the device of FIG. 2, with the closure means being engaged with a mold.
Figure 6:
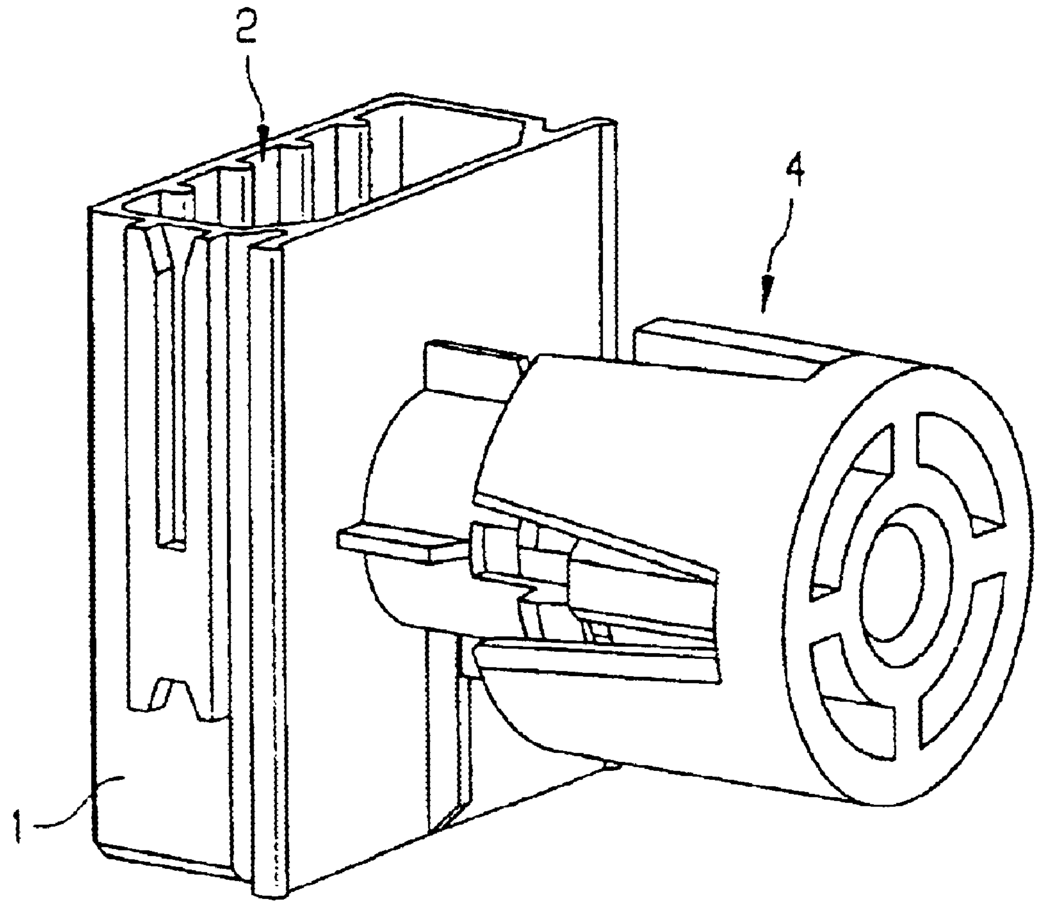
FIG. 6 shows a perspective view of the device of FIGS. 4 and 5.
Figure 7:
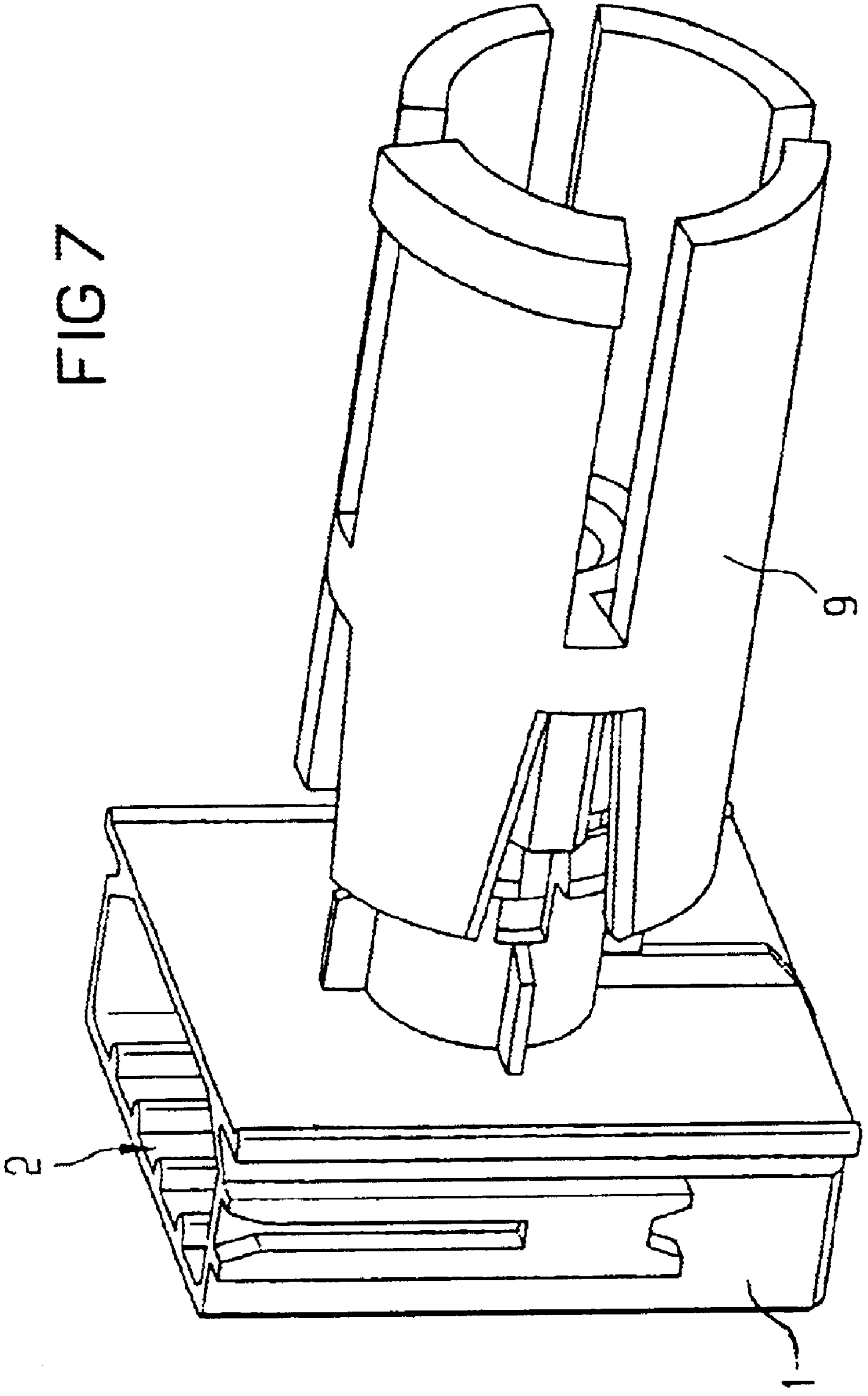
FIG. 7 shows a perspective view of a second embodiment of the device according to the present invention.

Coupling portion 3 is of a hollow cylindrical configuration and comprises an opening 5 best shown in FIG. 3 that serves as an optical window.

The finished optical component, (not shown) is preferably connected to an optical waveguide coupling portion 3. An optical transducer housed within the component can emit or receive light, and this light can be transmitted through the optical window in the opening 5, to the optical waveguide. It should be understood that the optical transducer can be any light emitting or receiving device.

The optical waveguide is mechanically connected to the optical component by means of an insert or ferrule in coupling portion 3. A latching 8 that is in the form of an annular snap type connecting mechanism is provided to secure the waveguide.

In the method of making the optical component, the mold 1 is first closed by a closure member 4. In particular, the opening 5 is closed to form the optical window. After insertion of a carrier of an optical transducer such as a LED into the mold 1, the carrier is positioned within mold 1. With the aid of a positioning means (not shown), which may be designed for example as complementary abutment areas, the carrier may be aligned exactly in the mold 1.

Thereafter, a liquid transparent resin is filled into mold 1 through the opening 2 and preferably is cured at a temperature of approx. 160° C. It should be understood that the molding material is selected for its optical transmission properties and environmental constraints such as device operating temperature. The cure temperate is based upon the selected molding material.

After removal of closure member 4, the optical component is completed.

The sequence of the afore-mentioned method steps can be carried out either as described or such that the resin is filled in first, and the carrier is then introduced and positioned.

Due to the required accurate and defect free (i.e. no scratches, corrugations etc.) surface of the optical window in the resin or molding material, the closure member 4 is first polished in the region of the sealing area 7 or window area 11 which forms the optical window.

Due to the fact that the closure member 4 is a separate piece and then becomes a constituent part of mold 1, it can be worked in an optimum manner in this area before assembly to the mold and can be matched to the optical window requirements. For example, the area may be polished to prepare the surface.

The sealed nature between mold 1 and closure member 4, which is required for molding, is obtained by the circumferential edge 6 of opening 5 that is closely abutted with sealing area 7. Both sections, the edge 6 and the sealing area 7 having a taper, may also be worked very accurately by polishing.

Closure member 4 is of plug-like configuration and is positioned exactly by a centering member 10 which in this case is in the form of a cylindrical surface that is brought into abutment with the inner circumference of latch 8. In this respect, the latch 8 by means of inclined abutment areas, permits a certain tolerance in the axial direction of the components.

After curing of the resin in the mold 1, the closure member 4 is removed. Preferably, there is provided a releasing member 9 as shown in FIGS. 7–10 for releasing the closure member 4 from the latch 8 of the mold 1.

Figure 9:
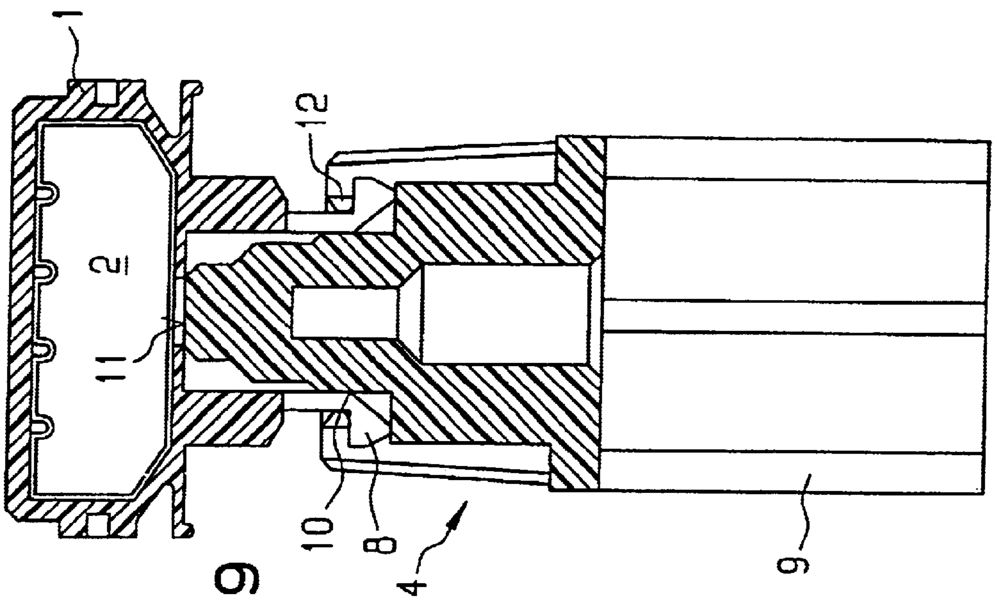
FIG. 9 shows a cross-sectional view of the device taken along the line 9—9 of FIG. 8.
Figure 8:
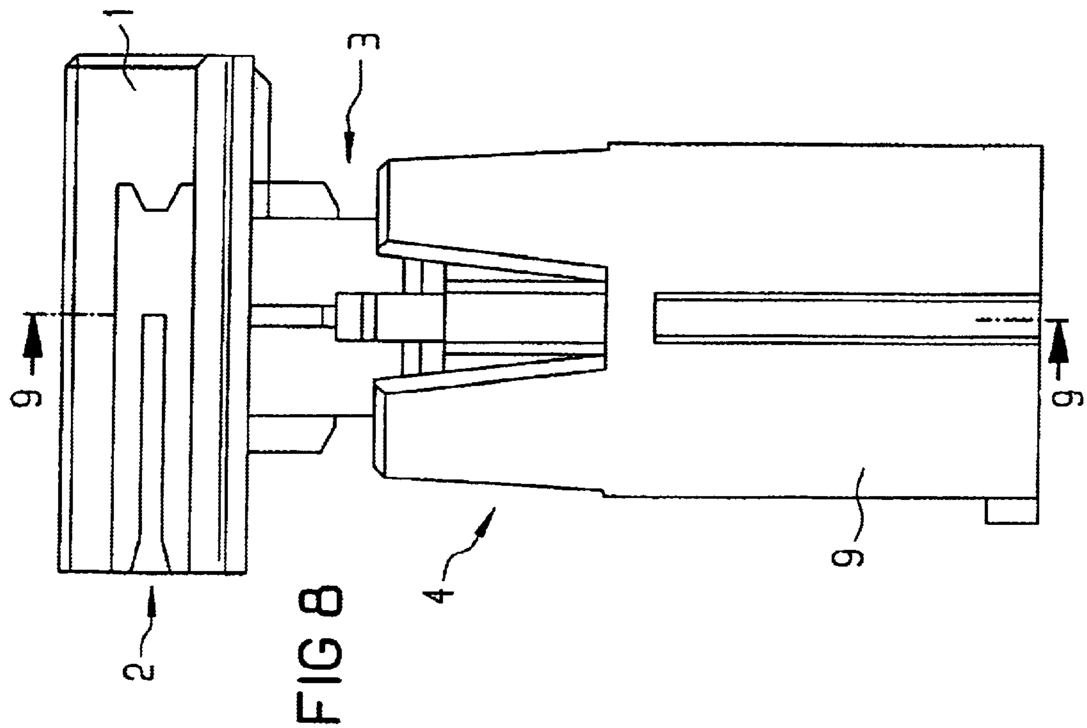
FIG. 8 shows a side view of the device of FIG. 7.
Figure 10:
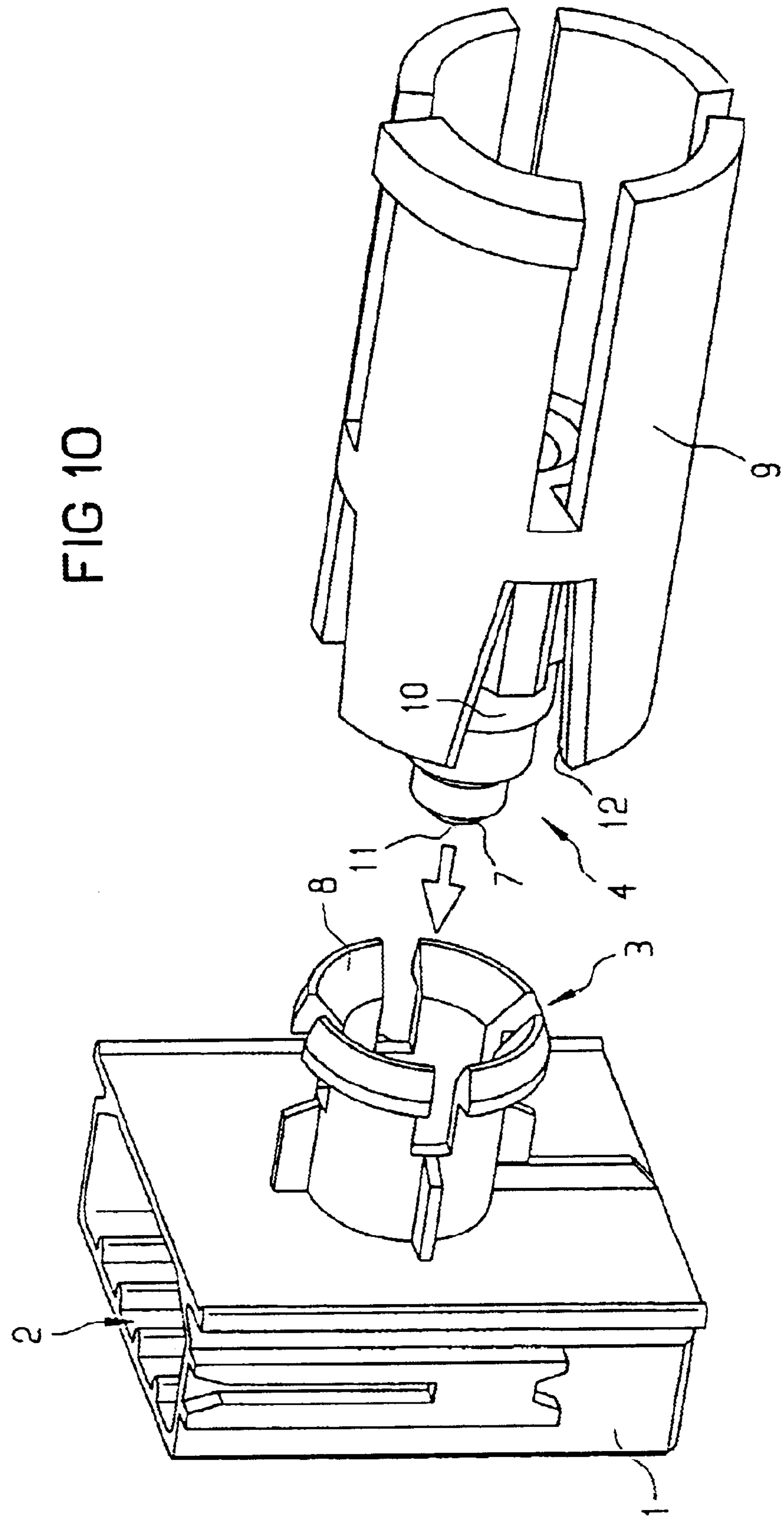
FIG. 10 shows an additional perspective view of the device of FIGS. 7 to 9, with the closure member being disengaged from the mold.

As best seen in FIG. 9, the releasing member 9 has inward projections forming the latching member 12 positioned at one end of a cantilever section. The projections of the latching member 12 engage the latch 8 to secure the closure member 4 to the mold 1. By applying an inward force to the cantilever section at an end opposite the latching member 12, the closure member 4 is released by the resultant outward motion of the latching member 12.

What is claimed is:

1. A method of making an optical component having a molded body of a transparent moldable material comprising:

introducing a closure member into a coupling portion of a mold the coupling portion having an opening, said opening having a circumferential edge for receiving a corresponding sealing area of the closure member;

filling the moldable material into the mold;

introducing a carrier of an optical transducer through a mold opening;

aligning the carrier in relation to the mold;

curing the moldable material; and, removing the closure member.

2. The method of claim 1 wherein the moldable material is a resin.

3. The method of claim 2 wherein the resin cures at approximately 160° C.

4. The method of claim 1 further comprising polishing the sealing area of the closure member.

5. The method of claim 4 wherein the sealing area is brought into engagement with the circumferential edge of the opening to form a window surface.

6. The method of claim 1 wherein the closure member is a plug having a polished surface in the region of the opening.

7. The method of claim 6 wherein the closure member is adapted to be releasable engaged with a latch in the coupling portion.

8. The method of claim 7 wherein the closure member is provided with a releasing member for release from said latch.

9. The method of claim 8 wherein the closure member has a centering means ensuring aligned, centered positioning of the closure member in relation to the opening.

* * * * *